United States Patent
Kim et al.

(10) Patent No.: US 7,197,141 B2
(45) Date of Patent: Mar. 27, 2007

(54) RSA CRYPTOGRAPHIC PROCESSING APPARATUS FOR IC CARD

(75) Inventors: Moo Seop Kim, Taejon (KR); Ho Won Kim, Taejon (KR); Yong Je Choi, Kwangju (KR); Young Soo Park, Taejon (KR); Kyo Il Chung, Taejon (KR); Heui Su Ryu, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 860 days.

(21) Appl. No.: 10/318,034

(22) Filed: Dec. 13, 2002

(65) Prior Publication Data

US 2003/0120944 A1   Jun. 26, 2003

(30) Foreign Application Priority Data

Dec. 20, 2001   (KR) ................. 10-2001-0081717

(51) Int. Cl.
*H04K 1/00* (2006.01)
*H04L 9/00* (2006.01)

(52) U.S. Cl. ..................... 380/30; 380/28; 703/193
(58) Field of Classification Search ............. 380/30, 380/28; 713/193
See application file for complete search history.

(56) References Cited

U.S. PATENT DOCUMENTS 5,073,870 A * 12/1991 Morita .................... 708/491
5,144,574 A * 9/1992 Morita .................... 708/491
5,666,419 A * 9/1997 Yamamoto et al. ........... 380/28
6,356,636 B1 * 3/2002 Foster et al. ................. 380/30
6,434,585 B2 * 8/2002 McGregor et al. ........... 708/491
2003/0009503 A1 * 1/2003 Glaser et al. ............... 708/625
2003/0065813 A1 * 4/2003 Ruehle ..................... 709/238

FOREIGN PATENT DOCUMENTS

WO    WO 9819231 A1 *  5/1998

* cited by examiner

*Primary Examiner*—Gilberto Barron
*Assistant Examiner*—Samson Lemma
(74) *Attorney, Agent, or Firm*—Mayer Brown Rowe & Maw LLP

(57) ABSTRACT

Disclosed is an RSA cryptographic processing apparatus capable of performing the fast operating function. A modular multiplication operation or a modular exponentiation operation, i.e., an RSA cryptographic operation, is selectively performed according to a control signal inputted, the modular operation of the data of 512 to 1024 bits is iteratively performed by use of 32-bit operating unit, and the data of 512 to 1024 bits is operated by use of a 32-bit operating unit, thereby minimizing the size of the register storing the data and reducing the size of the cryptographic apparatus, and which the intermediate value generated at the operation process is stored in the internal register instead of the memory, thereby minimizing the times of access to the memory.

29 Claims, 4 Drawing Sheets

RSA CRYPTOGRAPHIC PROCESSING APPARATUS FOR IC CARD

BACKGROUND OF THE INVENTION

1. Field of the Invention

The present invention relates to an RSA cryptographic processing apparatus for an IC card, and more particularly, to an RSA cryptographic processing apparatus for an IC card capable of performing an RSA cryptographic algorithm among public key cryptographic algorithms used for providing the security to protect the private information of card's users and prevent the important information of the card from being appropriated. The present invention may be embodied, for example, in an IC card system, but it will be appreciated that it is also useful in other applications, such as miniature packages including a cryptographic processor, expensive electronic appliances and so forth, requiring a function of authenticating the identification of a user and restricting the access of an unrelated person, if necessary.

2. Background of the Related Art

Generally, IC cards or smart cards are commonly known as a card capable of storing, managing and processing the information therein by use of built-in processor and memory Since such cards have the excellent security characteristic which is not provided by general magnetic strip cards or memory cards, the cards are used in combination with various card readers, such as computer, passage controller, mobile phone and so forth, so as to control the access to the information resources. In particular, the cards are applied to various information communication services such as electronic commerce, traffic, broadcasting and so forth. The IC card provides a cryptographic function to provide the security suitable for the use condition in various application fields as described above. RSA cryptographic algorithm among public key cryptographic algorithms which are widely used in the IC cards is an asymmetric cryptographic algorithm for cryptographic operation or digital signature. In order to provide the transaction using the cards with the security, the RSA cryptographic algorithm is employed in Visa, Mastercard and EMV card system, for example, in the form of Secure Electronic Transaction protocol.

The operation of the RSA cryptographic algorithm is performed by the modular exponentiation operation of which the operation process called as modular multiplication represented by Equation 1 is iteratively executed.

Equation 1

RSA public key encrypting/decrypting algorithm

Encryption in case of sending a message m from "B" to "A":

1. obtain a public key (n, e)
2. represent the message m by a constant between [0, n−1]
3. compute $c = m^e \bmod n$
4. send the generated ciphertext c to "A"

Decryption of A receiving the message c:

1. compute $m = c^d \bmod n$ using a private key

Specifically, the basic operation of the RSA algorithm is an iterative modular multiplication operation on a large number above 512 to 1024 bits, as will be known from step 3 in Equation 1. With respect to two numbers A and B, and a modular value M, assuming the residual which is left when a multiplied result of A and B is divided by M is C, the modular multiplication may be represented by the following Equation 2.

$$C = AB \bmod M = AB - \left[\frac{AB}{M}\right]M \qquad \text{Equation 2}$$

Among several algorithms performing the modular multiplication of Equation 2, a Montgomery algorithm is widely used because of performing the modular operation using only multiplication and addition, without using division operation needing a lot of time.

According to Montgomery algorithm, the arbitrary constant A is transformed into AR mod M which is a residual class number system of the constant M on the constant R generated by modulus M, and the modular operation is performed in the new transformed set. At that time, the constant R is selected by a prime constant larger than M. The Montgomery modular multiplication algorithm for performing the modular multiplication is represented by the following Equation 3.

Equation 3

Montgomery modular multiplication: $ABR^{-1}$

1. S=0
2. iterate the following steps on i from zero to (n−1)
3. begin
4. $Q_i = ((S_0 + A_i B_0)(r - M_0)^{-1}) \bmod r$
5. $S = (S + A_i B + Q_i M) \text{ div } r$
6. end
7. if $S \geq M$, compute $S = S - M$ Since the Montgomery multiplication operation shown in Equation 3 transforms the original number system into a residual class number system, this may not be applied to the RSA cryptographic algorithm of Equation 1. The calculation of the RSA cryptographic algorithm using the Montgomery multiplication is performed by use of a Montgomery exponentiation algorithm such as Equation 4.

Equation 4

Input: $m = (mn_{-1} \ldots m_1 m_0)r$, $xp = xR \bmod m$, $A = R \bmod m$, $e = (e_t \ldots e_{1e0})_2$.

Output: $x^e \bmod m$ 1. iterate the following steps from t to zero
2. A=Mont(A, A)
3. if $e_i = 1$, A=Mont(A, xP)
4. A=Mont(A, t)

As will be known from Equation 4, the RSA cryptographic operation using the Montgomery modular exponentiation operation performs iteratively the Montgomery modular exponentiation operation represented by Mont( ) according to a exponent value.

When calculating a value S, since the Montgomery modular multiplication operation shown in Equation 3 is performed by the estimation on the result value, the result value S of the operation may be an actual result value of the modular multiplication operation or be larger as much as modulus M than the actual result value. Accordingly, in order to obtain the actual result value of the Montgomery modular multiplication, the last compensating step such as step 7 has to be required.

As described above, according to an RSA cryptographic processing circuit using the Montgomery modular exponentiation operation, since an operating unit is large, i.e., the data to be processed at once is above 512 to 1024 bits, a register or memory region for storing an intermediate value generated at the operation process has to employ a large space above 512 to 1024 bits. In this case, the more the registers required for storing the data, modulus values and the exponent values (key values of user) to be inputted for the RSA cryptographic operation be increased, the more the size of the circuit is increased. Also, the more the number of memories is used, the more access times of the memory to store or read the data in the memory is increased. Therefore, since the speed of performing the cryptographic operation is reduced, there is a disadvantage that it is unsuitable for the IC card requiring the small size and fast cryptographic circuit.

SUMMARY OF THE INVENTION

Accordingly, the present invention is directed to an RSA cryptographic processing apparatus having a fast operating function at a small size that substantially obviates one or more problems due to limitations and disadvantages of the related art.

An object of the present invention is to provide an RSA cryptographic processing apparatus capable of performing the fast operating function, in which a modular multiplication operation or a modular exponentiation operation, i.e., an RSA cryptographic operation, is selectively performed according to a control signal inputted, the modular operation of the data of 512 to 1024 bits is iteratively performed by use of 32-bit operating unit, and the data of 512 to 1024 bits is operated by use of a 32-bit operating unit, thereby minimizing the size of the register storing the data and reducing the size of the cryptographic apparatus, and which the intermediate value generated at the operation process is stored in the internal register instead of the memory, thereby minimizing the times of access to the memory.

To achieve the object and other advantages, according to one aspect of the present invention, there is provide an RSA cryptographic processing apparatus for a processor of an IC card system, the apparatus comprising: a memory for storing a data required for a modular operation in each allocated areas, sequentially supplying the data required for the modular operation by a control signal according to implementation of the modular operation, and storing the result value of the modular operation; an interfacing unit circuit for transmitting and receiving a control signal and the data required for the modular operation transmitted from the processor of the IC card system; a control register for storing information to control an operation mode of a cryptographic operation according to the control signal transmitted from the processor to the interfacing unit; an input register for previously reading and storing a data required for a modular multiplication or a modular exponentiation operation from the memory according to the information stored in the control register; a modular unit for performing the modular multiplication or modular exponentiation operation required for the cryptographic operation using an internal register by reading a value stored in the input register; a subtracting unit for compensating the result value calculated by the modular unit; and a control unit for storing the control signal transmitted from the processor of the IC card, loading the data from the memory to perform the modular operation according to the control signal, providing the modular unit with the data through the input register, and generating a control signal required for the modular operation.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

A preferred embodiment according to the present invention will now be explained with reference to the accompanying drawings.

Figure 1:
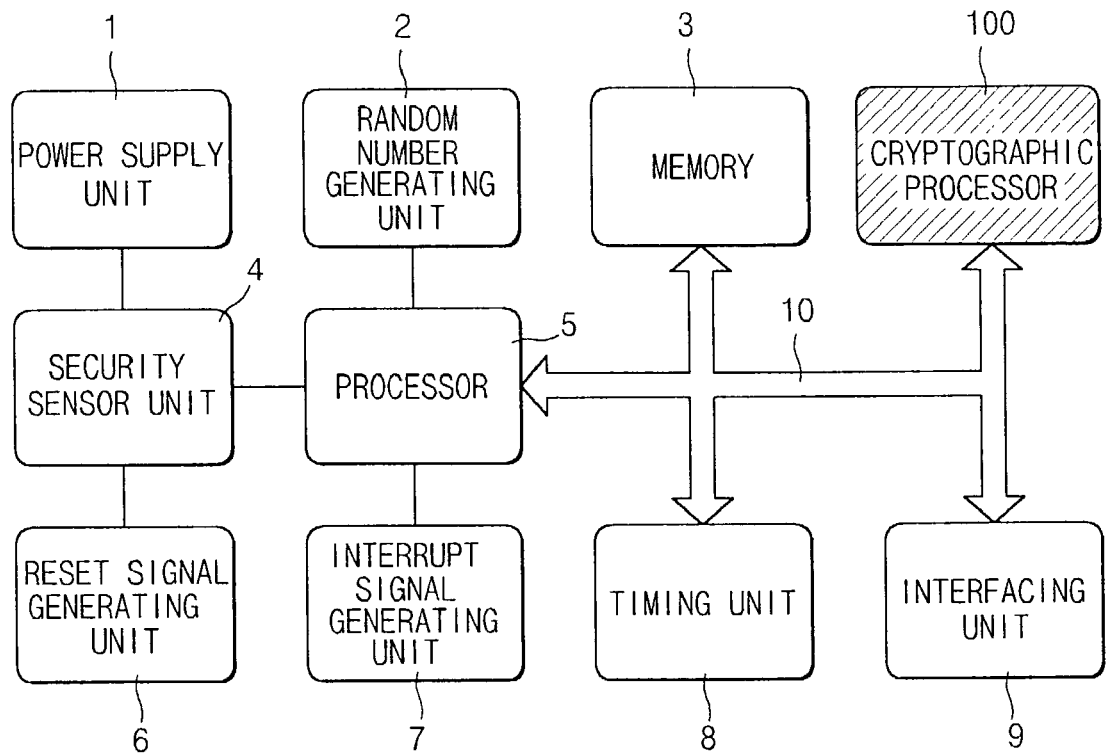
FIG. 1 is a block diagram showing an IC card system according to the present invention.

FIG. 1 is a block diagram showing an IC card system to which the present invention is applied. The IC card system includes a power supply unit 1, a random number generating unit 2 for generating random numbers for use in cryptographic operation, a memory 3 for storing various data for use in the cryptographic operation, a security sensor unit 4 for authenticating the security by connecting to an external security authenticating unit, a processor 5 for controlling the operation of the IC card, a reset signal generating unit 6 for generating a reset signal to execute the cryptographic operation, an interrupt signal generating unit 7 for generating an interrupt signal, a timing unit 8 for generating a clock, an interface 9 for the interface with an external equipment, and a cryptographic processor 100 for implementing the cryptographic operation through the control of the processor 5. Since the construction and operation of the IC card system have been known in the prior art, the description thereof will now be omitted. The construction and operation of the cryptographic processor 100 according to the present invention will now be described.

Figure 2:
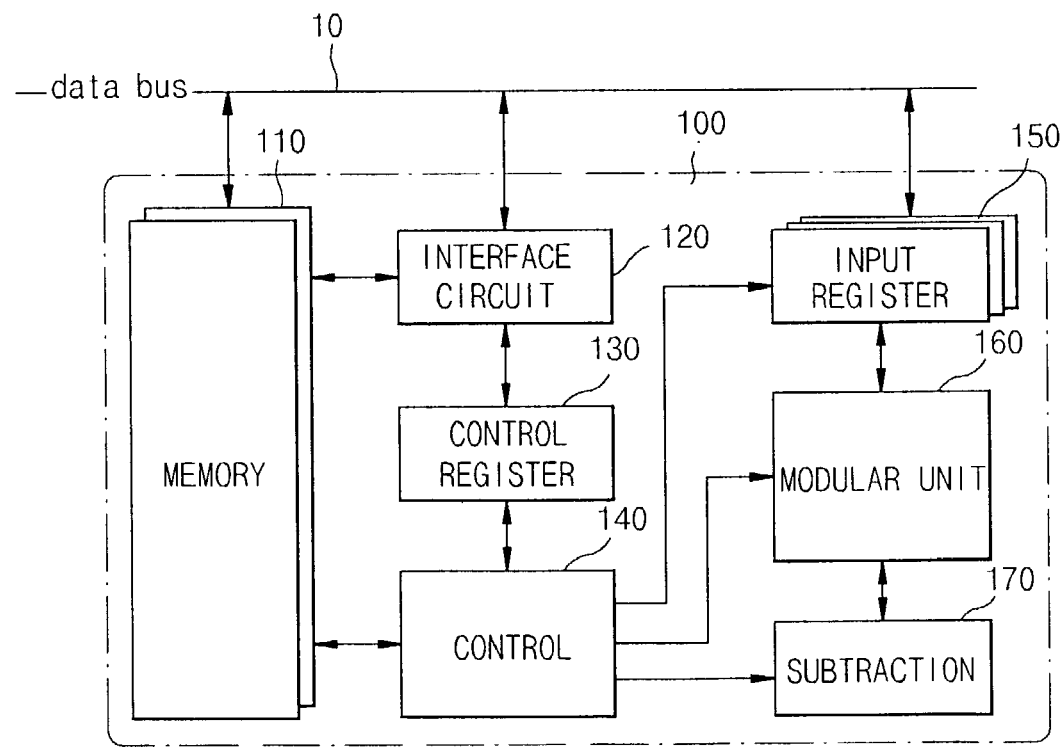
FIG. 2 is a block diagram showing the cryptographic processor shown in FIG. 1.

FIG. 2 is a block diagram showing the construction of the cryptographic processor 100 for effectively embodying an RSA cryptographic algorithm of Equation 1 by use of a Montgomery modular multiplication algorithm of Equation 3 and a Montgomery exponentiation algorithm of Equation 4. Referring to FIG. 2, the cryptographic processor 100 includes a memory 110, an interface circuit 120, a control register 130, a control 140, an input register 150, a modular unit 160, and a subtraction 170.

A data bus 10 is a data bus 155 of the IC card system, and is connected to the memory 110, the input register 150 for storing the data for use in the modular operation, and an output of the modular unit 160, there providing a data path for reading the data or modulus value required for the modular multiplication and storing the resulted value of the modular operation in the memory 110.

The memory 110 stores the data required for the modular operation, such as data, modulus value, user key and the like, in the respective allocated areas, sequentially supplies the data required for the modular operation by a unit of 32 bits through the data bus 10 by a control signal generated from the control 140 according to the implementation of the modular operation, and reads and stores the resulted value of the modular operation by a unit of 32 bits through the data bus 10.

The interface circuit 120 transmits and receives the control signal or data transmitted from the processor 5 of the IC card system, and communicates with the processor 5 of the IC card system and the cryptographic circuit to execute the operation.

Figure 6:
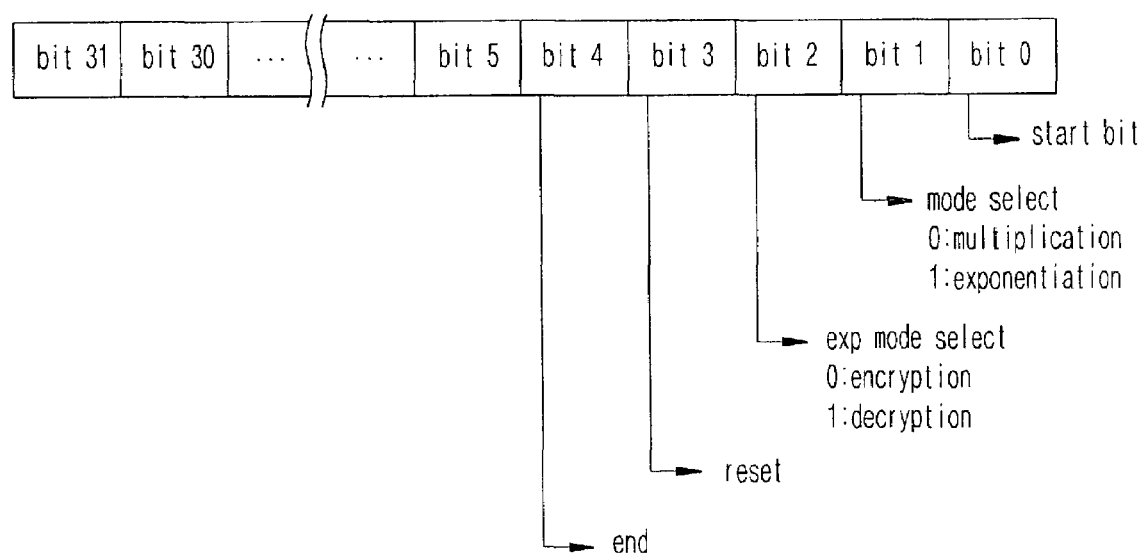
FIG. 6 is a view showing one preferred embodiment of the control register shown in FIG. 2

The control register 130 stores an operation command of the cryptographic circuit and data related to the internal condition depending upon the control signal transmitted from the processor 5 of the IC card system to the interface circuit 120. The information stored in the control register 130 includes, as shown in FIG. 6, a reset signal for initializing the cryptographic circuit, a start signal instructing the operation start of the cryptographic circuit, an operation mode selecting signal for determining whether the operation to be executed in the cryptographic circuit is the modular multiplication or the modular exponentiation operation, an exponentiation mode selecting signal for determining whether to be an encrypting operation or a decrypting operation in case that the operation of the cryptographic circuit is the modular exponentiation operation, and an end signal for notifying that the operation is completed in the cryptographic circuit. The respective control signals are set as 1 bit data, and the register control signal storing the data in the control register 130 is provided in the control 140.

The control 140 generates a control signal required for the modular operation and provides the respective circuits with the control signal, and also supplies a control signal for storing the control signal transmitted from the IC card processor 5 to the cryptographic circuit in the control register 130, a control signal for loading the data in the memory 110 to execute the modular operation, all control signals required for executing the modular multiplication operation to execute the modular operation, and a control signal required for again storing the resulted value obtained after the modular operation in the memory 110.

Specifically, the control 140 generates the register control signal for storing the control signal transmitted from the IC card processor 5 to the cryptographic circuit to execute the modular operation, supplies the memory 110 with an address of the memory 110 to sequentially read the data required for the modular operation from the memory 110 and the memory control signal for reading and writing the data of the memory 110, generates a register control signal for selectively storing the data, which is inputted to the modular circuit from the memory 110, in the input register 150, generates a control signal required for a process of executing the modular operation by use of the data sequentially stored in the input register 150, generates the control signal and address and the memory control signal required for storing the resulted value obtained after the modular operation, and provides the control register 130 with the control signal notifying the completion of the modular multiplication operation.

The input register 150 reads and stores the data required for executing the modular multiplication or exponentiation operation from the memory 110 by a unit of 32 bits. The data inputted at that time may be varied depending upon the operating mode of the cryptographic circuit stored in the control register 130. If the operating mode of the cryptographic circuit stored in the control register 130 is the modular multiplication, the inputted values are a multiplier A, a multiplicand B, a modulus M, and a pre-computed value for Montgomery multiplication operation. Meanwhile, if the operating mode of the cryptographic circuit stored in the control register 130 is the modular exponentiation, the inputted values are data D to be encrypted, a cryptographic key E, the modulus M, and a pre-computed value for the Montgomery exponentiation operation. At that time, the register signal storing the data of the memory 110 in the respective registers is supplied to the control 130

The modular unit 160 executes the modular multiplication or exponentiation operation required for the cryptographic operation, and basically includes a multiplier for executing 32-bit multiplying operation, an adder for executing the 32-bit adding operation, a register for storing an intermediate value of the operation, and a data selector for selectively setting the data required for the operation of the multiplier and the adder. Also, the modular unit 160 iteratively operates the Montgomery modular multiplication operation of Equation 3 and the Montgomery modular exponentiation operation of Equation 4 according to the cryptographic circuit operating mode value set in the control register 130, thereby storing the resulted value in an intermediate value storing register. At that time, the modular unit 160 is provided from the control 140 with all control signals of the respective processes required for executing the modular operation.

The subtraction 170 is used for compensating the resulted value computed by the Montgomery modular multiplication operation or the Montgomery modular exponentiation operation, and executes a process of step 7 of Equation 7. Also, the subtraction 170 compares the resulted value obtained from the modular unit 160 with the modulus M, and if the resulted value is higher than the modulus value, after subtracting the modulus value from the resulted value of the modular unit 160, stores the result in the memory 110; otherwise stores the operation result of the modular unit 160 in the memory 110. At that time, in the process of determining whether or not the result of the modular operation is higher than the modulus M, the modulus value is subtracted from the resulted value of the modular unit 160 by a unit of 32 bits from the least significant word to the higher word. If the subtracted result of the most significant word generates a borrow signal, since the operated result of the modular unit 160 is smaller than the modulus M, the operated result of the modular unit 160 is stored in the memory 110. Otherwise, in case no the borrow signal generates, the result of the subtraction is stored in the memory 110.

Figure 3:
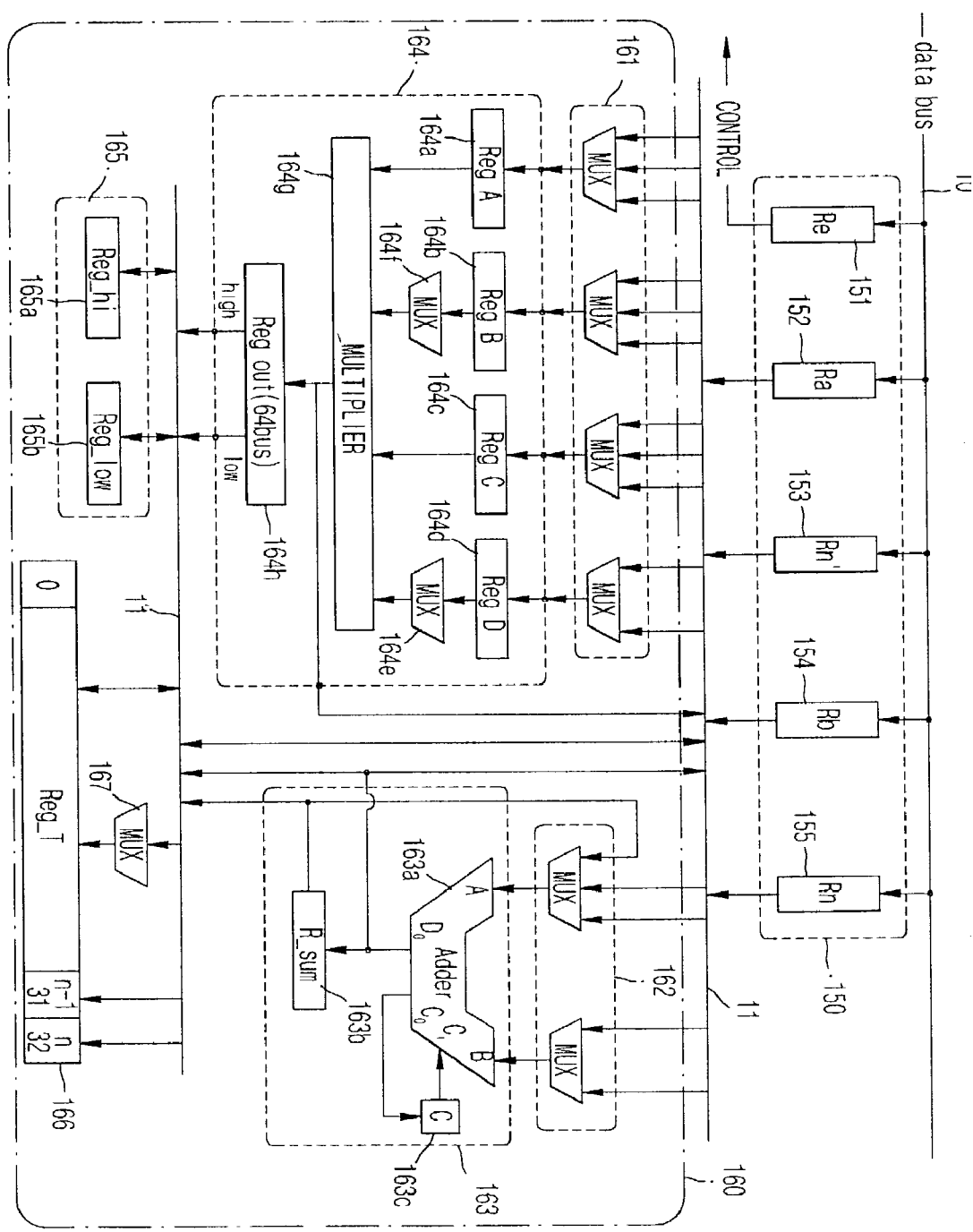
FIG. 3 is a block diagram showing the modular unit shown in Fin. 2.

The detained operation of the cryptographic circuit for the IC card according to the present invention will now be described. FIG. 3 is a view showing the input register 150 and the modular unit 160 shown in FIG. 2.

The input registers 150 and 150 shown in FIG. 3 include a register Re 151, a register Ra 152, a register Rn' 153, a register Rb 154, and a register Rn 155.

The register Re 151 is a register for storing an exponent value e at the Montgomery modular exponentiation operation shown in Equation 4, and stores the data by a unit of 32 bits. If the value of the operation mode of the cryptographic circuit set in the control register 130 is set as the exponentiation operation, the register Re 151 reads and stores the data required for the operation from the memory 110 The register control signal for storing the data in the register Re 130 is supplied to the control 140.

The register Ra 152 is a 32-bit register, in which the data read from the memory 110 may be varied depending upon the value of the operation mode of the cryptographic circuit. If the operation mode of the control register 130 is set as the Montgomery modular multiplication operation, the multiplier A of Equation 3 is stored in the register Ra 152. Meanwhile, if the operation mode of the control register 130 is set as the Montgomery modular exponentiation operation, the data A (R mod M) of Equation 4 is stored in the register Ra 152. Considering the storage of the data in the register Ra 152, if the data of the corresponding address of the memory is transmitted to the data bus 10 by the memory control signal supplied from the control 140 to the memory 110, the data of the data bus 10 is stored by the register control signal supplied from the control 140.

The register Rn' 153 is a 32-bit register storing a value (r−M0)−1 at step 4 of executing the Montgomery modular multiplication operation of Equation 3 The value (r−M0)−1 is constant relative to the modulus M regardless of the operation mode of the cryptographic circuit set in the control register 130, and is pre-computed and stored in the memory 110. Since the value (r−M0)−1 is constant relative to the modulus M regardless of the modular multiplication or modular exponentiation operation, the value may be read at once only in the operation of the cryptographic circuit. The register control signal loading the data of the memory into the register Rn' is also supplied to the control 140.

The register Rb 154 is a 32-bit register storing the data required for the modular operation, in which the data read from the memory 110 may be varied depending upon the value of the operation mode of the cryptographic circuit et in the control register 130. If the operation mode of the control register 130 is set as the Montgomery modular multiplication operation, the multiplicand B of Equation 3 is stored in the register Rb 154. Meanwhile, if the operation mode of the control register 130 is set as the Montgomery modular exponentiation operation, the data xp (xR mod M) of Equation 4 is stored in the register Rb 154. The register control signal loading the data into the register Rb is also supplied to the control 140.

The register Rn 155 is a register reading and storing the modulus M required for the cryptographic circuit from the memory 110, and is operated by the register control signal supplied from the control 130.

Also, FIG. 3 is a view showing the detailed structure of the modular unit 160 in FIG. 2 Considering the modular unit 160 with respect to FIG. 3, the modular unit 160 includes a first data selecting circuit 161, a second data selecting circuit 162, an adder circuit 163, a multiplier circuit 164, a temporary register 165, an intermediate value storing register 166, an internal data bus 11, and a third data selecting circuit 167.

The first data selecting circuit 161 selectively supplies the input data of the multiplier circuit executing the 32-bit multiplication operation of Equation 3 from the internal data bus 11, and the selecting control signal required for sequentially selecting the data is supplied from the control 140.

The second data selecting circuit 162 sequentially selects the data inputted to the adder circuit 163 executing the adding operation for the Montgomery modular multiplication operation of Equation 3, and the control signal setting a data path for the adding operation is supplied from the control 130.

The adder circuit 163 executing the addition operation of the data of 32 bits is used in a process of executing the sequential multiplication by adding the significant result of 32 bits among the output of the 32-bit multiplier circuit 164 to the result of a nest multiplication, as well as the execution of the addition operation in Equation 3. Also, the adder circuit 163 is used to compute a carry value of the most significant word prior to storing the operation result in the intermediate value storing register 166 storing the result of the multiplication operation of the entire data.

The adder circuit 163 includes an adder 163a for executing the addition operation of the data of 32 bits, a register R_sum 163b for storing the adding result, and an 1-bit register C 163c for storing the carry generated from the adding result The data of register R_sum 163b storing the result of the addition operation is supplied to circuits through the internal data bus 11 for a next operation, and the data of the register C 163c storing the carry of the adding operation is used as an input of the next operation or may be discarded, if necessary. The register control signal for storing the data of the register R_sum 163b and register C 163c and the control signal for discarding the value of the register C 163c are supplied to the control 140.

The multiplier circuit 164 is a circuit for executing the multiplication operation, and more particularly, is a combination circuit having an input of data of 32 bits and a multiplying output of 64 bits so as to execute the modular operation. The multiplier circuit 164 sequentially executes by a unit of 32 bits the multiplication operation of $A_iB_0$ at $Q_i+((S_0+A_iB_0)(r-M_0)^{-1})$ mod r of step 4 in Equation 3 and the multiplication operation of $A_iB_0$ and $Q_iM$ at $(S+A_iB+Q_iM)$ div r of step 5. At that time, the iterative and sequential execution of the multiplication operation is achieved by that the first data selecting circuit 161 selects and supplies the data of the input register 150, the temporary register 165 or the intermediate value storing register 166 according to the control signal supplied from the control 140.

The multiplication circuit 164 is a circuit adapted to simultaneously execute the multiplication operation of step 4 and the adding operation of step 5 of Equation 3, and includes registers 164a to 164d for previously storing the data of 32 bits so as to speed up the operation, a data selector 164e for selecting and inputting the data of a multiplier 164g in order to divide the multiplication of the data of 32 bits into a unit of 8 bits, 16 bits or 32 bits and iteratively execute the operation, the multiplier 164g receiving the data of 32 bits and executing 32 bit*32 bit+32 bit+32 bit, and a register 164h for sequentially storing the output data of 64 bits of the multiplier 164g.

Figure 5:
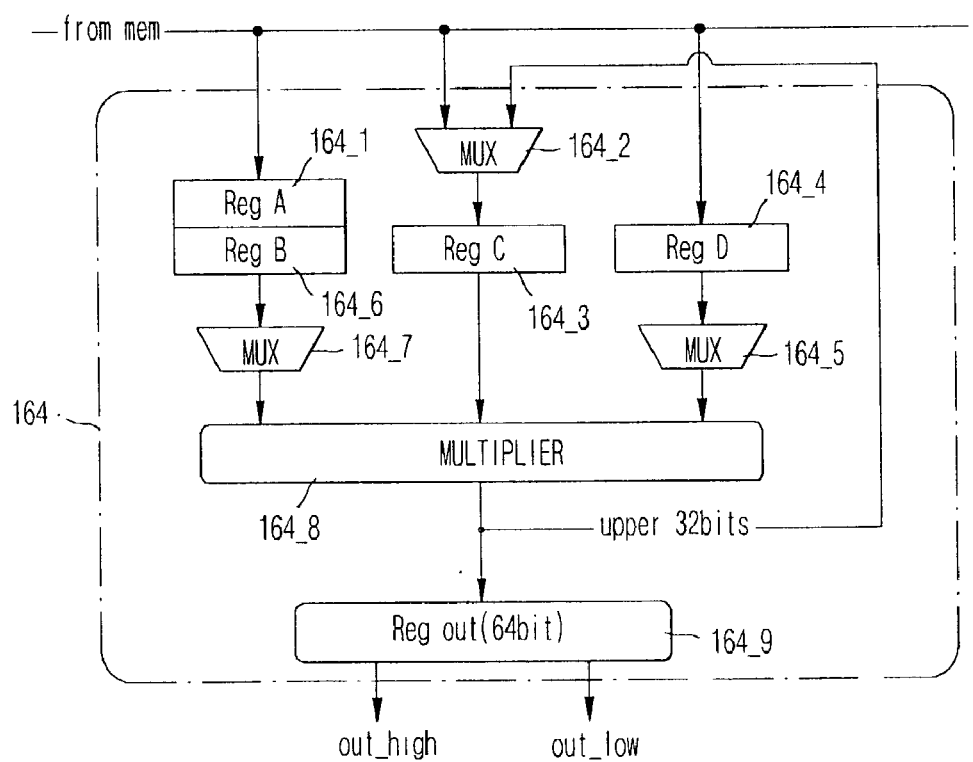
FIG. 5 is a block diagram showing a multiplying unit according to one preferred embodiment of the modular operating unit shown in FIG. 2.

Also, in order to speed up the multiplication operation by executing the multiplication operation and the addition operation in a single clock, as shown in FIG. 5, the multiplication circuit 164 may include an additive multiplier 164_8 or receive the data used for the multiplication in FIG. 5 from the data bus 10 directly, without storing it in the registers 164_1, 164_3, 164_4 and 164_6.

The temporary register 165 includes a register Reg_hi 165a storing a higher data of 32 bits, and a register Reg_low 165b storing a lower data of 32 bits, the data being among the output of the multiplication circuit 164. The data of the temporary registers 165a and 165b are supplied to the operation circuits through the internal data bus 11, and are used in the next operation or stored in the intermediate value storing register 166.

The intermediate value storing register 166 sequentially stores the result value generated the respective steps when iteratively executing the modular operation according to Equations 3 and 4. In case of the intermediate value of the modular multiplication operation is directly stored in the memory 110, the method of directly loading the data required every time executing the operation into the memory 110 has a drawback of increasing a time relative to the number of times accessing to the memory. Instead of storing the intermediate value in the memory 110, the number of times accessing to the memory is reduced by storing the intermediate value in the memory, so that the time needed for the modular operation may be reduced. The intermediate value storing register 166 consists of a combination of 32-bit registers. The dimension of the intermediate value storing register is more one word than a length of the data computing the modular multiplication in view of the carry happening at the process of executing the modular multiplication operation. Specifically, in case of executing the modular multiplication operation of 512 bits, the dimension of 544 bits is used, while in case of executing the modular multiplication operation of 1024 bits, the dimension of 1056 bits is used. In addition, the value of the respective words of the intermediate value storing register 166 sequentially stores the result of the modular multiplication operation using the 32-bit multiplication circuit 164 from the lower word to the higher word. At that time, a word location of the intermediate value storing register 166 for storing the result of the multiplication circuit 164 is set by the third data selecting circuit 167 according to the control signal provided from the control 140.

Since the most significant word of the intermediate value storing register 166 uses only one bit of the least significant word, the dimension of the intermediate value storing register 166 may use a length longer one bit than it of the data computed. After the entire multiplication process is completed by executing the modular multiplication operation using the multiplication operation by 32 bits, the value stored in the intermediate value storing register 166 may be the result of the Montgomery modular multiplication, and high as mush as the modulus value. If the value of the intermediate value storing register 166 is higher than the modulus value, the operation of subtracting the modulus value from the value of the intermediate value storing register 155 has to be executed.

The internal data bus 11 is a data path connecting the operation circuits within the cryptographic circuit, in which the respective operation circuits may use a data path commonly used to each other or use a data bus independently connected to each other. The internal data bus 11 is used as a path providing the operation circuit with the data of the input register 150, and is also used as a path providing the addition circuit 163 and the multiplication circuit 164 with the values generated at the operation process of the cryptographic circuit. In addition, the internal data bus 11 is used as a path storing the operation result of the multiplication circuit 164 in the temporary register 165, and is also used as a path storing the operation result in the intermediate value storing register 166.

When large data above 512 bits to 1024 bits is iteratively computed by use of 32-bit multiplication circuit 164 and 32-bit adding circuit 163, the third data selecting circuit 167 designates a position of the word for sequentially storing the result value generated in the respective operation processes in a proper position of the intermediate value storing register 166, in which the path control signal designating the position of the intermediate value storing register 166 is supplied from the control circuit 140.

The compensation of the modular operation value through the comparison of the modulus value and the value stored in the intermediate value storing register 166 is executed in the subtraction 170 of FIG. 2. The subtraction 170 of FIG. 2 comprises, as shown in FIG. 3, a subtraction circuit 171 and an output signal selecting circuit 172.

The subtraction 171 is a combination circuit capable of executing the operation of the value of modulus M subtracting by a unit of 32 bits from the output of the modular unit 160, and executes the subtraction operation by receiving the value of the intermediate value storing register 166 and the value of modulus M in order by 32 bits from the lower word to the higher word. At that time, the control signal sequentially reading the value of the intermediate value storing register 166 from the memory 110 is supplied from the control 140.

Considering the operation of the subtraction circuit 171, the result value of subtraction operation executed by the 32-bit subtraction 171a by 32 bits from the lower word to the higher word is stored in the register R_sub 171b, and the subtraction result of 32 bits stored in the register R_sub 171b is stored in the memory 110 in the course of the subtraction operation of the next higher word. The borrow signal generated at the subtraction process is stored in a borrow register B 171c so as to be used in the subtraction operation of the next higher word, and is again inputted in the subtraction 171a. At that time, the control 140 sets the output signal selecting circuit 172 so as to store the result of the subtraction operation in the memory 110.

Completing the subtraction operation from the lower word to the higher word, the result of subtracting the value of modulus M from the result of the modular unit 160, and the result of the modular operation is stored in the intermediate value storing register 166 The register control signal for storing the result value of the subtraction operation generated in the process of executing subtraction operation in the register R_sub 171b and the register control signal for storing the borrow signal generated in the subtraction process are supplied to the control 140.

After completing the subtraction operation for compensating the result value of the modular operation, if the control 140 checks the value of the borrow register B 171c of the subtraction circuit 171 so as to whether the result to be stored in the memory 110 is again stored as the value of the intermediate value storing register 166 or the value stored in the memory 110 is left as it is while executing the subtraction process, the output signal selecting circuit 172 sets a path of the data stored in the memory 110.

Specifically, after completing the Montgomery modular operation in the modular unit 160, the subtraction 170 sequentially executes the subtraction operation by a unit of 32 bits, and the result of the subtraction stored in the register R_sub 163b is stored in the memory 110 in the course of the subtraction of the next higher word. After completing the subtraction operation by iterating the above process, the result of subtracting the value of modulus M from the result value of the modular unit 160 is stored in the memory 110, and the operation result of the modular unit 160 is stored, as it is, in the intermediate value storing register 166

When the control 140 checks the value of the borrow register B 171c of the subtraction circuit 171 after the subtraction operation, if there is a borrow, the operation result of the modular unit 160 is smaller than the modulus M, thereby storing the value of the intermediate value storing register 166 in the memory 110. At that time, in order to sequentially store the value of the intermediate value storing register 166 in the memory 110, the register control signal of reading the data by a unit of 32 bits from the intermediate value storing register 166 and loading the data in the data bus 10, a memory address for storing the data of the data bus 10 in the corresponding address of the memory 110, and the memory control signal for writing the data in the memory are supplied by the control 140. If the values of the intermediate value storing register 166 are stored in the memory 110 in the above-mentioned process, the control 140 stores an end signal indicating the completion of the operation in the control register 130. At that time, the register control signal for setting the end signal in the control register 130 is supplied to the control 140.

When the control 140 checks the value of the borrow register B 171c of the subtraction circuit 171 after the subtraction operation, if no there is the borrow, the result of subtracting the modulus M from the operation result of the modular unit 160 is the result of the modular operation. Since the result value is previously stored in the memory 110 in the course of the subtraction operation, the control 140 stores the end signal indicating the completion of the operation in the control register 130.

Figure 4:
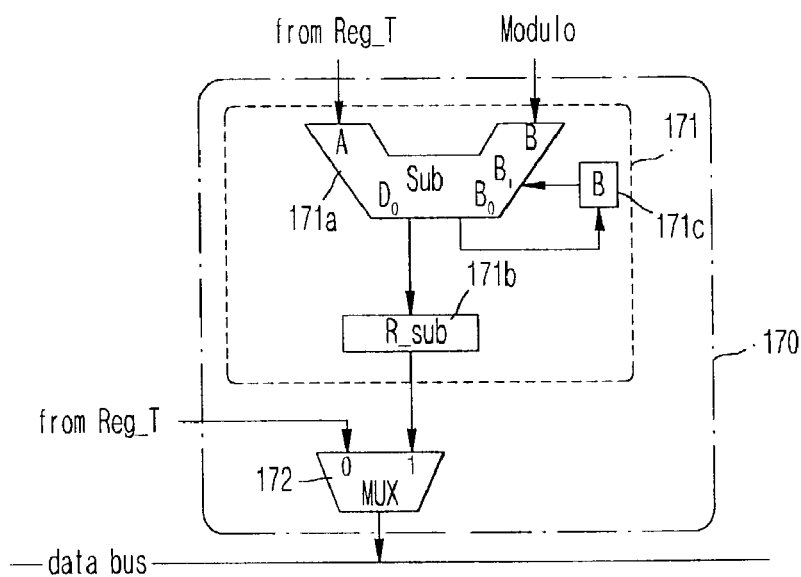
FIG. 4 is a block diagram showing the subtracting unit shown in FIG. 2.

The operation of the modular unit having the structure shown in FIGS. 2, 3 and 4 will now be described with respect to the modular multiplication operation and the modular exponentiation operation, respectively. First of all, it will now be described the case that the cryptographic circuit proposed by the present invention executes the modular multiplication operation of 1024 bits.

In the memory 110, the multiplier A and multiplicand B which are data value of 1024 bits required for the modular multiplication, the modulus M, and the pre-computed value R' which is a value of 32 bits required for executing the modular multiplication using the Montgomery algorithm are stored by the processor 5 of the IC card.

In order to drive the cryptographic circuit in the cryptographic processor 100 because of requiring the operation of the modular multiplication in the processor 5 of the IC card, the processor 5 transmits the control signal to the cryptographic processor 100 through the data bus 10. The control signal sent to the cryptographic processor 100 is transmitted to the interface circuit 120, and then sets the control register 130 in that the operation mode of the cryptographic circuit is the modular multiplication and a start signal indicating the start of the operation has been inputted.

If the control 140 detects through the data of the control register 130 that the operation mode of the cryptographic circuit is the modular multiplication and the start command of the operation is inputted, the control 140 initializes all blocks in the cryptographic circuit. And then, the control 140 sequentially reads the multiplier A and multiplicand B which are initial data values required for executing the modular multiplication operation, the value of the least significant word of the modulus M, and the pre-computed value R' required for executing the Montgomery multiplication, and generates the memory control signal and register control signal to store them in the registers Ra 152, Rb 154, Rn 155 and Rn' 153.

In step 2 of Equation 3, a factor i is a factor denoting the number of times of iterating the operations of steps 4 and 5, in which since a value n for executing the modular multiplication operation of the data of 1024 bits is 32, the value i has 32 times of iterating processes from zero to 31.

The operation $Q_i$ of step 4 has a constant value in the respective processes that the value i of step 2 is gradually increased from zero to 31, and the operation $Q_i=((S_0+A_iB_0)(r-M_0)^{-1})$ mod r of step 4 is again executed two times of multiplication. First, the value $(r-M_0)^{-1}$ is the pre-computed value, and is stored in the register Rn' 153 as the initial data. The value $S_0+A_iB_0$ is obtained by adding the least significant word of the intermediate value storing register 166 and the value resulted by multiplying the $i^{th}$ word data of the multiplier by the least significant word of the multiplicand B. After the multiplication operation is executed with respect to the above values and the value stored in the register Rn' 153, only the lower data of 32 bits is left as the value of $Q_i$ by the operation mod r. Since the operation process of step 4 is implemented by twice multiplication operation and adding operation, the control 140 generates the control signal for reading the data required for the next multiplication from the memory 110 and storing it in the corresponding register while the multiplication operation to reduce the operation time The operation of step 5 is a part requiring the longest time for executing the modular multiplication operation, in which S, B and M are data having a length of 1024 bits. Accordingly, in case of executing the operation by use of the 32-bit multiplier and the 32-bit adder, 32 times of iterative operations are carried out. In order to execute the operation of step 5, the data S, B and M are inputted from the memory 110 by a unit of 32 bits, respectively. The operation is executed from the lower word to the higher word in order of $S_0+A_iB_0+Q_iM_0$, $S_1+A_iB_1+Q_iM_1$, ..., $S_{31}+A_iB_{31}+Q_iM_{31}$, and the values obtained therefrom are sequentially stored in the intermediate value storing register 166. If the values resulted from the respective operations of step 5 are not stored in the intermediate value storing register 166 but directly stored in the memory, since it needs the time requiring the time for writing the result values of the respective steps in the memory to execute step 5, as well as the time reading the multiplier and multiplicand, the operation time for executing the modular multiplication is increased, thereby performing the fast modular multiplication operation.

The respective additions on the routine i is represented by $Sj+AiBj+QiMj$, wherein j is a factor indicating the number of internal routines iteratively executing from zero to 31. The $j^{th}$ operation includes steps of executing the operation $Sj+AiBj$ and adding the result of the operation $Sj+AiBj$ and the result of the operation $QiMj$. The lower data of 32 bits among data of 64 bits generated at the operation is stored in the temporary register Reg_low 165b, and then is stored in the $j^{th}$ word location of the intermediate value storing register 166. The higher data of 32 bits is stored in the temporary register Reg_hi 165a, and then is used in the operation of the $j+1^{th}$ routine. If j of step 5 executes 32 times of iterative operations, the data of 1024 bits which is the value S on the routine i is stored in the intermediate value storing register 166, and the carry data generated in step 5 is stored in the most significant word of the intermediate value storing register 166

After the factor i is incremented by 1 if the iteration of steps 4 and 5 on the routine i is completed, the iteration of steps 4 and 5 is executed. These operations are continued until the factor i is iterated 32 times The $i^{th}$ multiplier Ai, the $j^{th}$ multiplicand Bj, and the modulus value Mj in the memory are stored by previously reading the data of the next iterated process while the present multiplication operation, so that the time required for loading the data from the memory 110 may be reduced.

If the modular multiplication operation is executed until the most significant word by executing the operation, with the number of iteration being increased, the operation result of the modular circuit is stored in the intermediate value storing register 166. The Montgomery modular multiplication algorithm executes the operation by transforming the multiplier value and multiplicand value into other residual class number system according to the any estimation on the result value, so that the result may be not a correct value. Therefore, it is necessary to compensate the result value by determining whether the value obtained from the execution of the modular multiplication is correct or not This compensating work employs the fact of the Montgomery algorithm in that the result value of the Montgomery modular multiplication is a wanted output value or is large as much as the modulus M.

In order to compensate the result value of the Montgomery multiplication operation, first of all, the control 140 checks whether the value of the most significant word of the intermediate value storing register is 1 or not. If the value of the most significant word of the intermediate value storing register is 1, it is the case that the value of the Montgomery modular multiplication operation is not the wanted value but is large as much as the modulus M. Therefore, the operation of subtracting the modulus M from the data of the intermediate value storing register 166 has to be executed. The subtraction operation is executed by shifting from the least significant word of the intermediate value storing register 166 and the least significant word of the modulus M stored in the memory 110 to the higher word, and the result of the subtraction is stored in the register R_sub 171b, and then is again stored in the memory 110. At that time, the result of the modular multiplication operation is stored in the intermediate value storing register 166 as it is.

When executing the subtraction operation for compensating the result value of the modular multiplication operation, the memory and register control signal for sequentially reading the modulus M from the memory 110 and storing it in the register Rn 155 are supplied from the control 140. The control signal capable of previously reading the modulus value of the higher word from the memory 110 and storing it in the register Rn 155 is generated to execute the subtraction of the next higher word while executing the subtraction operation.

In case the most significant word of the intermediate value storing register 166 is 1, since the data of the intermediate value storing register 166 is larger than the modulus M of data of 1024 bits, only data of 32 words are used for subtraction. The borrow signal of the register B 171c generated from the subtraction of the most significant word data is disregarded. The control 140 sets the control signal indicating the completion of the operation in the control register 130.

If the most significant word of the intermediate value storing register 166 is 0, it is impossible to know whether the value of intermediate value storing register 166 is larger or smaller than the modulus M, the value stored as the result of the modular multiplication. In this case, it may possible to determine the dimension by use of the borrow data of the register B 171c obtained from the subtraction the modulus M from the value of the intermediate value storing register 166.

In case that the most significant word of the intermediate value storing register 166 is 0, in order to compensate the result of the modular multiplication, the result value obtained from the 32-bit subtraction operation by loading the least significant word of the intermediate value storing register 166 and the least significant word of the modulus M stored in the memory 110 is stored in the register R_sub 171b, and then is again stored in the memory 110. The borrow signal generated at the subtraction process is stored in the register B 171c to perform the subtraction operation of the next most significant word data, and then is supplied to the next subtraction operation.

At that time, in order to store the data of the next higher word in the register Rn 155 in the course of executing the subtraction operation for executing the fast operation, the register control signal is supplied from the control 140.

If the subtraction is sequentially executed from the lower word to the most significant word, the result of the Montgomery modular multiplication operation is still stored in the intermediate value storing register 166, and the result obtained by subtracting the modulus M from the value of the intermediate value storing register 166 which is the result of the Montgomery modular multiplication operation is stored in the memory 110. After the subtraction operation is completed, the selection of the result of the modular multiplication is determined by use of the borrow signal of the register B 171c generated by executing the subtraction of the most significant word.

If the borrow signal is 1, since the data of the intermediate value storing register 166 is smaller than the modulus M, the control signal is supplied to the control 140 to again store the value of the intermediate value storing register 166 in the memory 110 If all of the data of the intermediate value storing register 166 is stored in the memory 110, the control 140 sets the control signal indicating the completion of the operation in the control register 130.

If the borrow signal is 0, since the data of the intermediate value storing register 166 is larger than the modulus M, the value of the present memory 110 stored in the course of the subtraction operation is the result of the modular multiplication. Therefore, the control 140 sets the control signal indicating the completion of the operation in the control register 130

The processor 5 receiving the control signal indicating the completion of the operation from the control register 130 through the interface circuit 120 is loaded with the result of the modular multiplication operation from the memory 110 through the data buss 155 and 10.

The above process has been described with reference to the fact that the operation mode of the cryptographic circuit set in the control register 130 is set as the modular multiplication operation. Hereinafter, it will now be described the case that the operation of the cryptographic circuit is set as the modular exponentiation operation.

First of all, in the memory 110, the data A(R mod M) for modular exponentiation operation according to Equation 4, a value xp(xR mod M) transformed into the Montgomery residual class number system on the data x to be encrypted, the key value E or D of the user, and the modulus value M are stored by the processor 5.

The values A and xp transformed into the Montgomery residual class number system for the modular exponentiation operation may be calculated by the software to be inputted in the memory 110, and may be hardware-calculated by use of the modular multiplication operation to be stored in the memory 110.

In case of executing the modular exponentiation operation to encrypt the data of the processor 5 of the IC card, the processor 5 transmits the operation mode of the cryptographic circuit and the control signal notifying the start of the operation to the cryptographic processor 100 through the data bus 10. The control signal sent to the cryptographic processor 100 sets in the control register 130 through the interface circuit 120 the operation mode of the cryptographic circuit as the modular multiplication and the start signal notifying the start of the exponentiation operation.

If the control 140 detects through the data of the control register 130 that the operation mode of the cryptographic circuit is the modular multiplication and the start signal indicating the start of the operation is set, the control 140 initializes all blocks in the cryptographic circuit. And then, the control 140 stores the data A, xp and M in the registers Ra 152, Rb 154 and Rn 155 by reading the values of the least significant word from the memory 100. Since the operation of the exponent value E (or D) is started from the most significant bit, the value of the exponent value E (or D) is read and stored in the register Re 151.

In the exponent value $e=(e_t \ldots e_1 e_0)$ used for the modular exponentiation operation of Equation 4, $e_t=1$. In other words, since the most significant bit et of the exponent value means the most significant digit of the value e having a value of first 1 not zero, the control 140 has to search the value t meaning the substantially most significant bit of the exponent value E.

In order to obtain the value t which means the most significant bit of the exponent value E, the control 140 sets the iterative factor i as 1024 of the highest value of the data to obtain the initial value t, and checks whether the value E of 32 bits stored in the register Re 151 is zero. If the value E stored in the register Re 151 is zero, the control 140 decreases the bits number of word, 32, in the iterative factor i. And then, the control 140 reads the value E of the next most significant word, stores it in the register Re 151, and then checks whether the value E of 32 bits is zero. The above process is a process of searching the most significant word to find the location of the most significant bit of the exponent value E, in which the value of the factor i has multiple values of 32.

If the location of the most significant word has been searched, except for zero, by iterating the above process, a process of searching the location of the most significant bit is performed at the word. First of all, the search from the most significant bit to the lower bit of the corresponding word is performed to check whether the value of the bit is 1. If the value of bit is zero, after the value of factor i is decreased by 1, a process of checking whether the next bit is 1 is performed. If the value of bit becomes 1 by iterating the above process, the factor value i is a value of t indicating the substantially most significant location of the exponent value E. The factor value i is used as a variable I designating the iterating times of the operations in steps 1 and 3 of Equation 4.

Instead of searching the location of word as the above process to find the most significant location t of the exponent value E, another method of obtaining the location of t may be provided to check whether the value of the respective bits is 1 by searching it from the most significant bit to the least significant bit of the respective words (from the most significant word to the least significant word).

After obtaining the most significant location t of the exponent value E, the cryptographic circuit executes first the operation A=Mont (A, A) according to the square operation of step 2 in Equation 4. The Mont A ( ) means the Montgomery modular multiplication operation, and the Mont (A, A) means to store the result obtained from the Montgomery modular multiplication operation in the area A of the memory 110, in which A is the multiplier and multiplicand used in the Montgomery modular multiplication operation, respectively. In order to execute fast the square operation of step 2, a square circuit may be used instead of the modular multiplication operating unit.

In step 3, if the exponent value e, corresponding to the $i^{th}$ bit of the present iterative factor is 1 after the square process of step 2 is executed, the operation A=Mont (A, xp) is executed by use of the modular multiplication operation If the bit exponent value e, corresponding to the present factor i is zero, the value of the factor i indicating the iterating times is decreased by 1, and then the process of steps 2 and 3 is iterated. Due to the iterative factor i is decreased by 1 whenever executing steps 2 and 3, the operation is iterated until i=0 indicating the least significant bit of the exponent value E.

The Montgomery modular operation employs the constant R obtained by the modulus M to transform the original data into the Montgomery residual class number system for performing the estimation on the result value. The result value obtained by executing the above iterative process (t+1) times by use of the value transformed into the Montgomery residual class number system does not contain a value related to the constant R.

Accordingly, in order to obtain the original modular operation value, it has to eliminate values calculated by the constant R contained in the Montgomery modular operation result, this being called as Montgomery reduction process. The operation of A=Mont(A, 1) such as step 4 of Equation 4 may be performed to obtain the original modular exponent value.

In the Montgomery multiplication operation for executing Mont(A, 1) of step 4, to set the value of multiplicand B as 1 may be calculated by setting the value of multiplicand B of the memory 110 as 1 in the IC card processor 5. In addition, the value of multiplicand B for the operation of step 4 may be driven by setting the value of the register Rb 154 as 1 at the first iteration of the multiplication and setting the value as zero at the remaining iteration, when the data of the memory 110 is maintained and the Montgomery multiplication of step 4 is performed in the memory 140.

If the modular exponentiation operation is performed by the above iterative operation, the control 140 sets the end control signal indicating the completion of the operation in the control register 130, and then sets it as the initial state waiting the command of the next operation.

Therefore, according to the structure of the RSA cryptographic processing apparatus of the present invention, in case of performing the modular operation on the large data above 512 to 1024 bits, the modular multiplication operation and a modular exponentiation operation are selectively performed by use of the control register controlling the operation of the cryptographic circuit, thereby improving the application of the cryptographic circuit. The circuit required for the operation is effectively realized by use of the 32-bit operating unit, thereby minimizing the size of the cryptographic circuit. The intermediate value generated at the operation process is stored in the internal register instead of the memory, thereby minimizing the times of access to the memory and so realizing the fast operation.

With the above description of the IC card system of the present invention, since the cryptographic operation for performing the RSA cryptographic algorithm providing the security and confidentiality for the user may be executed in fast with the small size, thereby improving the security of the IC card. The present invention may be applied to the system requiring the cryptographic processor or the cryptographic function at the small size, such as a function of authenticating the identification of a user.

The forgoing embodiments are merely exemplary and are not to be construed as limiting the present invention. The present teachings can be readily applied to other types of apparatuses. The description of the present invention is intended to be illustrative, and not to limit the scope of the claims Many alternatives, modifications, and variations will be apparent to those skilled in the art.

What is claimed is:

1. An RSA cryptographic processing apparatus for a processor of an card system, the apparatus comprising,
   a memory for storing a data required for a modular operation in each allocated areas, sequentially supplying the data required for the modular operation by a control signal according to implementation of the modular operation, and storing the result value of the modular operation, an interfacing unit circuit for transmitting and receiving a control signal and the data required for the modular operation transmitted from the processor of the IC card system;

a control register for storing information to control an operation mode of a cryptographic operation according to the control signal transmitted from the processor to the interfacing unit;

an input register for previously reading and storing a data required for a modular multiplication or a modular exponentiation operation from the memory according to the information stored in the control register;

a modular unit for performing the modular multiplication or modular exponentiation operation required for the cryptographic operation using an internal register by reading a value stored in the input register, wherein the modular unit includes a multiplying unit for multiplying two 32 bit operands for performing iterative operation;

a subtracting unit for compensating the result value calculated by the modular unit; and control unit for storing the control signal transmitted from the processor of the IC card, loading the data from the memory to perform the modular operation according to the a control signal, providing the modular unit with the data through the input register, and generating a control signal required for the modular operation.

2. The RSA cryptographic processing apparatus as claimed claim 1, wherein the memory includes a memory commonly using a data path for input and output of the data, and a memory using discretely a data path the input and output of the data.

3. The RSA cryptographic processing apparatus as claimed claim 1, wherein the information stored in the control register includes any one of a reset signal for initializing the cryptographic circuit, a start signal indicating operating start of the cryptographic circuit, a mode selecting signal for determining whether the operation to be performed in the cryptographic circuit is the modular multiplication operation or the modular exponentiation operation, an exponentiation mode selecting signal for determining whether the operation is an encrypting operation or decrypting operation in case the operation of the cryptographic circuit is the modular exponentiation operation, and an end signal notifying completion of the cryptographic operation.

4. The RSA cryptographic processing apparatus as claimed claim 1, wherein the input register consists of 32 bits.

5. The RSA cryptographic processing apparatus as claimed claim 1, wherein the input register receives directly the data from the interfacing unit, in case a specific address is applied for the data, in addition to an address inputted from the memory.

6. The RSA cryptographic processing apparatus as claimed claim 1, wherein the modular unit includes a first data selecting unit selecting an input data for a multiplication operation, a second data selecting unit selecting an input data for an adding operation;

an adding unit for performing the adding operation of the data inputted from the second data selecting unit;

an intermediate storing register for storing an intermediate value resulted from the operation of the multiplying unit or the adding unit, and a third data selecting unit for setting a data storing path of the intermediate storing register.

7. The RSA cryptographic processing apparatus as claimed claim 6, wherein the first, second, and third data selecting units include a multiplexing unit or an inverse-multiplexing unit capable of selectively setting the data.

8. The RSA cryptographic processing apparatus as claimed claim 6, wherein the first, second, and third data selecting units sequentially select the data for the multiplication and adding operation.

9. The RSA cryptographic processing apparatus as claimed claim 6, wherein the multiplying unit simultaneously performs the multiplication and addition operation at one clock.

10. The RSA cryptographic processing apparatus as claimed claim 6, wherein the multiplying unit performs the iterative operation on a data of 32 bits by dividing the data of 32 bits in a unit of 8 bits or 16 bits.

11. The RSA cryptographic processing apparatus as claimed claim 6, wherein the multiplying unit includes a path setting unit for performing the iterative operation on a data of 32 bits by dividing the data of 32 bits in a unit of 8 bits or 16 bits.

12. The RSA cryptographic processing apparatus as claimed claim 6, wherein the intermediate value storing register includes a 32-bit register arranged sequentially.

13. The RSA cryptographic processing apparatus as claimed claim 6, wherein in the intermediate value storing register, a most significant word or bit value is used as a value determined for compensation of the result value.

14. The RSA cryptographic processing apparatus as claimed claim 6, wherein the intermediate value storing register includes a length larger one word or one bit than a modulus value performing modular multiplication operation.

15. The RSA cryptographic processing apparatus as claimed claim 1, wherein the modular unit includes a searching unit for searching a bit digit t of a value e= ($e_t \ldots e_1 e_0$).

16. The RSA cryptographic processing apparatus as claimed claim 1, wherein the modular unit includes a square operating unit for multiplication operation of the same data.

17. The RSA cryptographic processing apparatus as claimed claim 1, wherein the modular unit receives a digit of an exponent value from an exterior, so as to perform the modular exponentiation operation.

18. The RSA cryptographic processing apparatus as claimed claim 1, wherein the modular unit performs the modular multiplication operation and then utilizes the value as an input value, so as to transform a Montgomery residual class number system at performing the modular operation.

19. The RSA cryptographic processing apparatus as claimed claim 1, wherein the modular unit performs the operation by receiving a value transformed into a Montgomery residual class number system so as to perform the modular operation.

20. The RSA cryptographic processing apparatus as claimed claim 1, wherein the modular unit is synchronized with constant performing times of operation by use of a counter unit, when reading an exponent value from the memory by a unit of 32 bits, and loads the exponent value, so as to perform the modular exponentiation operation.

21. The RSA cryptographic processing apparatus as claimed claim 1, wherein the modular unit receives an exponent value according to the control signal of the control unit, so as to perform the modular exponentiation operation.

22. The RSA cryptographic processing apparatus as claimed claim 15, wherein the modular unit reads the exponent value by a word unit (32 bits), and after checking whether a value of the corresponding word is zero, searches a location of a bit of no zero, in a word of no zero, so as to search the digit t of the exponent value e.

23. The RSA cryptographic processing apparatus as claimed claim 15, wherein the modular unit reads the exponent value by a word unit, and after checking whether a value of the respective bits from the most significant bit to a lower bit of the corresponding word is 1, searches a location of the bit, so as to search the digit t of the exponent value.

24. The RSA cryptographic processing apparatus as claimed claim 1, wherein if the modular unit performs Mont(A, 1) in following Equation at performing the modular exponentiation operation, a value of a multiplicand 1 is set in the memory by the processor:

Equation
Montgomery exponentiation algorithm
Input: $m=(m_{N-1} \ldots m_1 m_0)r$, $xp=xR \bmod m$, $A=R \bmod m$, $e=(e_t \ldots e_1 e_0)_2$
Output: $x^e \bmod m$
1. iterate following steps from t to zero
2. A=Mont(A, A)
3. if $e_1=1$, A=Mont(A, xP)
4. A=Mont(A, t).

25. The RSA cryptographic processing apparatus as claimed claim 1, wherein if the modular unit performs Mont(A, 1) in following Equation at performing the modular exponentiation operation, in a value of a multiplicand 1, a value of a register Rb is initially set as 1 in an iterative process of performing a multiplication, and the value of register Rb is set as zero in a remaining operation process:

Equation A
Montgomery exponentiation algorithm
Input: $m=(m_{-1} \ldots m_1 m_0)r$, $xp=xR \bmod m$, $A=R \bmod m$, $e=(e_t \ldots e_1 e_0)_2$
Output: $x^e \bmod m$
1. iterate following steps from t to zero
2. A=Mont(A, A)
3. if $e_i=1$, A=Mont(A, xP)
4. A=Mont(A, t).

26. The RSA processing apparatus as claimed claim 1, wherein the subtracting unit includes
   a subtraction for performing an operation of subtracting a modulus value M from an output of the modular unit so as to compensate the result value of the modular operation, and
   an output selecting unit for selecting a path of the data to be stored in the memory according to the control signal of the control unit regarding an operation result of the subtracting unit.

27. The RSA cryptographic processing apparatus as claimed claim 26, wherein the subtraction receives the data stored as an intermediate value in the modular unit and a modulus value stored in the memory, and sequentially performs the subtraction operation by a unit of 32 bits from a lower word to a higher word.

28. The RSA cryptographic processing apparatus as claimed claim 1, wherein the control signal generated from the control unit includes
   a register control signal for storing the control signal transmitted from the processor of the IC card processor in the control register, or for notifying completion of the modular multiplication operation;
   a memory control signal for sequentially reading the data required for modular operation from the memory, or storing a result value obtained from the modular operation,
   an input register control signal for selectively storing the data inputted to the modular unit from the memory, in the input register, and
   a modular control signal required for a process of performing the modular operation by use of the data sequentially stored in the input register.

29. The RSA cryptographic processing apparatus as claimed claim 1, wherein the control unit sets an address required for storing the result of the modular operation in the memory according to a borrow signal generated at a subtraction operation of the subtracting unit, so as to compensate the result value of the modular operation.

* * * * *